(12) United States Patent
Cook et al.

(10) Patent No.: US 9,772,220 B1
(45) Date of Patent: Sep. 26, 2017

(54) HYDROPHONE

(71) Applicant: Exelis Inc., McLean, VA (US)

(72) Inventors: Gordon Douglas Cook, Midvale, UT (US); Roger Blake Nessen, Bountiful, UT (US)

(73) Assignee: Harris Corporation, Melbourne, FL (US)

( * ) Notice: Subject to any disclaimer, the term of this patent is extended or adjusted under 35 U.S.C. 154(b) by 594 days.

(21) Appl. No.: 14/173,584

(22) Filed: Feb. 5, 2014

Related U.S. Application Data

(60) Provisional application No. 61/913,023, filed on Dec. 6, 2013.

(51) Int. Cl.
*G01H 3/00* (2006.01)
*G01V 1/06* (2006.01)

(52) U.S. Cl.
CPC ................ *G01H 3/00* (2013.01)

(58) Field of Classification Search
USPC .................................................. 367/149
See application file for complete search history.

(56) References Cited

U.S. PATENT DOCUMENTS

| | | |
|---|---|---|
| 3,176,262 A | 3/1965 | Ehrlich et al. |
| 3,489,993 A * | 1/1970 | Massa, Jr. ............... G01S 1/725 367/120 |
| 4,794,295 A | 12/1988 | Penneck |
| 4,810,913 A | 3/1989 | Beauducel |
| 5,204,843 A | 4/1993 | Beauducel |
| 5,291,090 A | 3/1994 | Dias |
| 5,438,553 A | 8/1995 | Wilson |
| 5,642,332 A | 6/1997 | Chang |
| 6,498,769 B1 * | 12/2002 | Pearce ............... G01V 1/201 367/188 |
| 6,819,631 B2 * | 11/2004 | Pearce ............... G01V 1/201 367/188 |
| 6,879,546 B2 * | 4/2005 | Halvorsen ........... G01V 1/201 367/166 |
| 6,919,669 B2 | 7/2005 | Bryant |
| 7,369,716 B2 | 5/2008 | Berg |
| 8,385,155 B2 | 2/2013 | Stacey et al. |
| 8,398,551 B2 | 3/2013 | Adachi |
| 2003/0173874 A1 * | 9/2003 | Bryant ............... H04R 17/00 310/365 |

(Continued)

FOREIGN PATENT DOCUMENTS

| | | |
|---|---|---|
| CA | 1065046 | 10/1979 |
| EP | 1705489 | 9/2006 |
| WO | WO9013367 | 11/1990 |

OTHER PUBLICATIONS

Exelis; Airbacked Hydrophone; Copyright © 2013 Exelis Inc.
Exelis; PCMH-2 & 2Q Pressure Compensated Hydrophone; Copyright © 2011 Exelis Inc.

*Primary Examiner* — James Hulka
(74) *Attorney, Agent, or Firm* — Thorpe, North & Western, LLP

(57) ABSTRACT

A hydrophone has a pair of end caps each disposed on a different open end of an air-backed cylinder of a piezoelectric ceramic material. An electrode or lead extends through one of the end caps and into the cylinder, and has a shape and a lateral width that extends across an interior of the cylinder and abuts an inner surface of the cylinder at multiple points.

22 Claims, 5 Drawing Sheets

(56) References Cited

U.S. PATENT DOCUMENTS

| | | | |
|---|---|---|---|
| 2004/0017731 A1* | 1/2004 | Halvorsen | G01V 1/201 367/166 |
| 2004/0202401 A1* | 10/2004 | Berg | G01V 11/00 385/12 |
| 2008/0139946 A1* | 6/2008 | Adachi | A61B 8/4483 600/463 |
| 2009/0157315 A1* | 6/2009 | Ong | G01F 1/716 702/6 |
| 2011/0216626 A1* | 9/2011 | Stacey | H04B 11/00 367/131 |
| 2012/0174676 A1* | 7/2012 | Nyffenegger | G01V 1/186 73/647 |
| 2013/0208571 A1* | 8/2013 | Pearce | G01V 1/201 367/154 |
| 2013/0294203 A1 | 11/2013 | Goodman | |

* cited by examiner

HYDROPHONE

PRIORITY CLAIM

This application claims the benefit of U.S. Provisional Patent Application Ser. No. 61/913,023, filed Dec. 6, 2013, which is hereby incorporated herein by reference in its entirety.

BACKGROUND

Field of the Invention

The present invention relates generally to hydrophones.

Related Art

Geophysical marine streamers and towed arrays use hydrophones or sensors to detect in-water acoustic signals used in oil exploration and target identification. These hydrophones are grouped in frequency specific series/parallel combinations to form useful hydrophone channel assemblies that meet product performance needs.

The general characteristics of these types of hydrophones include a thin walled, air-backed cylinder of radially polarized, Lead Zirconate Titanate (PZT) piezoelectric ceramic. The PZT cylinder generates a voltage signal in direct proportion to the magnitude of a pressure wave that couples to the outer diameter of the cylinder surface. Rigid end caps are used to seal the air filled cylinder from hydrostatic pressure and shield the inner surface of the ceramic cylinder from pressure loading. Positive and negative electrodes are connected to the inner and outer wall surfaces to transmit low level voltages to signal conditioning, filtering and pre-amplification circuitry.

Conventional air-backed, end-capped, cylindrical hydrophone designs are labor intensive and costly to manufacture. They typically use ground alumina end caps that require centering fixtures, during bonding, which need cleaning after multiple uses. Conventional design also use solder joints to attach the positive electrical lead to the inner diameter of the cylinder which requires costly surface preparation and post solder cleaning operations. The rigid alumina end caps present a high acoustic impedance ($Z=\rho c$ where $\rho$ represents the density of a medium and c represents the speed of sound in a medium) surface that serves to scatter acoustic waves within the fluid filled towed array to create destructive interference with coherent acoustic waveforms. This condition reduces effective towed array acoustic performance.

SUMMARY OF THE INVENTION

It has been recognized that it would be advantageous to develop a hydrophone that retains the positive attributes of a conventional air-backed, end-capped cylindrical hydrophone, while eliminating negative cost and performance features. In addition, it has been recognized that it would be advantageous to develop a hydrophone that eliminates wire soldering on the inner surface of the cylinder. In addition, it has been recognized that it would be advantageous to develop a hydrophone with end caps without the need for alignment fixtures or clean up. Furthermore, it has been recognized that it would be advantageous to develop a hydrophone with end caps that have a material with superior acoustic impedance ($Z=\rho c$) matching properties to reduce acoustic scattering within the towed array.

The invention provides a hydrophone comprising an air-backed cylinder comprising a piezoelectric ceramic material. A pair of end caps is disposed on open ends of the cylinder. An electrode or lead extends through one of the end caps and into the cylinder and abuts an inner surface of the cylinder. An electrode or lead has a shape and a lateral width that extends across an interior of the cylinder and abuts an inner surface of the cylinder at multiple points.

In accordance with a more detailed aspect of the invention, the electrode or lead can have a coiled shape defining a spring-loaded configuration abutting to the inner surface of the cylinder.

In addition, the invention provides a hydrophone comprising an air-backed cylinder comprising a piezoelectric ceramic material. A pair of end caps is disposed on open ends of the cylinder. Each end cap has a tapered, self-centering protrusion extending into and mating with the cylinder. Each end cap has a convex exterior surface forming a dome. Each end cap comprises a PolyEtherEtherKetone (PEEK) material. An electrode or lead extends into the cylinder and is electrically connected to the inner surface of the cylinder.

In accordance with a more detailed aspect of the invention, the electrode or lead can extend through one of the end caps and into the cylinder, and can abut an interior of the cylinder without solder. The electrode or lead can have a shape and a lateral width that extends across an interior of the cylinder, and can abut the inner surface of the cylinder at multiple points. The electrode or lead can have a coiled shape defining a spring-loaded configuration to abut to the interior of the cylinder without solder.

Furthermore, the invention provides a hydrophone comprising an air-backed cylinder comprising a piezoelectric ceramic material. A pair of end caps is disposed on open ends of the cylinder. Each end cap has a tapered, self-centering protrusion extending into and mating with the cylinder. Each end cap has a convex exterior surface forming a dome. An electrode or lead extends through one of the end caps and into the cylinder and abuts an interior of the cylinder. The electrode or lead has a substantially round cross-sectional shape. The electrode or lead has a coiled shape defining a spring-loaded configuration to abut to the interior of the cylinder without solder. The coiled shape of the electrode or lead has an open interior space free of structure. The coiled shape of the electrode or lead has an outer diameter outside of the cylinder that is greater than an inner diameter of the cylinder so that the electrode or lead applies a spring force in a radially outward direction to an inner surface of the cylinder.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 2a is a side view of an end cap of the hydrophone of FIG. 1a;

FIG. 2b is a side view of another end cap of the hydrophone of FIG. 1a;

FIG. 3 is a cross-sectional side view of the cylinder of the hydrophone of FIG. 1a;

FIG. 4 is a side view of the electrode or lead of the hydrophone of FIG. 1a;

FIG. 5 is a side view of the hydrophone of FIG. 1a;

FIG. 6 is a cross-sectional end view of the hydrophone of FIG. 1a;

Figure 1A:
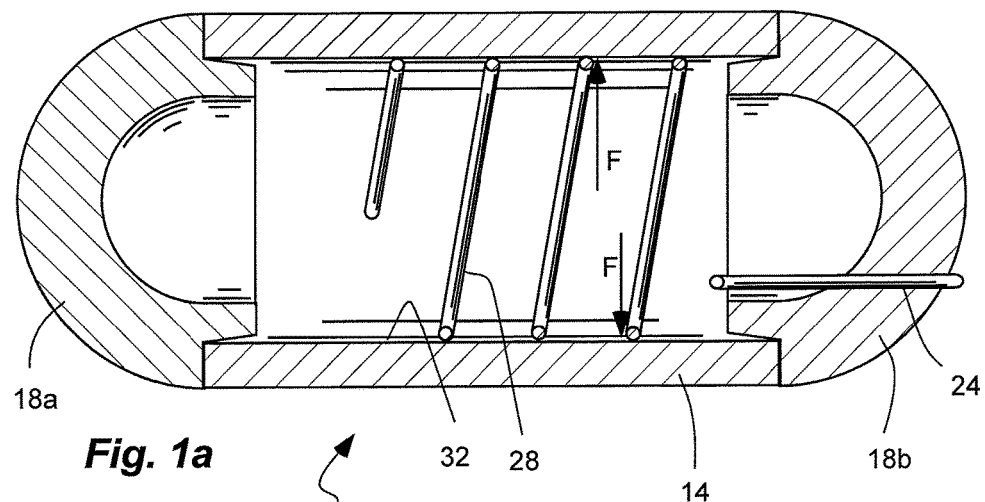
FIG. 1a is a cross-sectional side view of a hydrophone in accordance with an embodiment of the present invention.
Figure 1B:
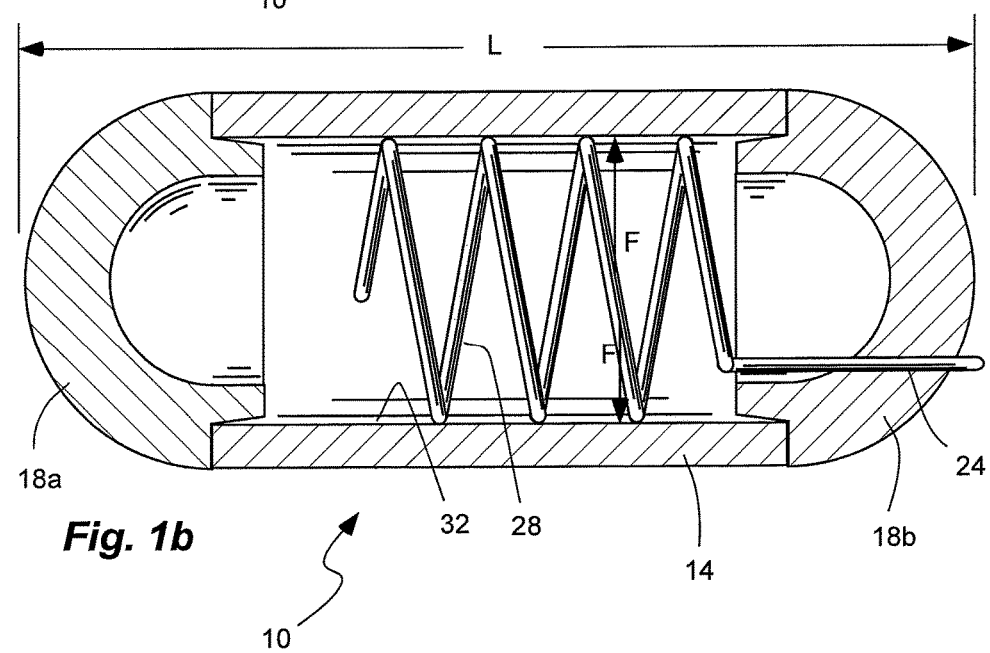
FIG. 1b is a cross-sectional side view of a cylinder and a pair of end caps of the hydrophone of FIG. 1a shown with an electrode or lead without cross-section.
Figure 2A:
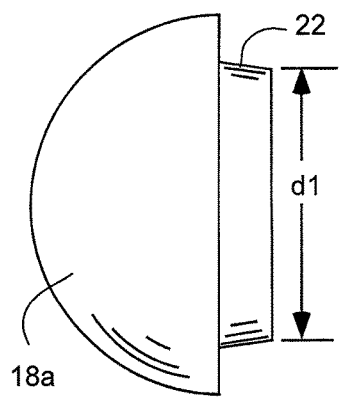
Figure 2B:
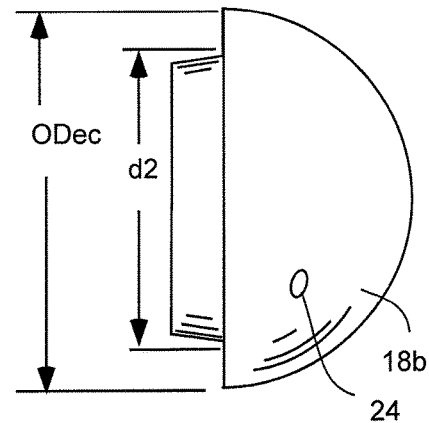
Figure 3:
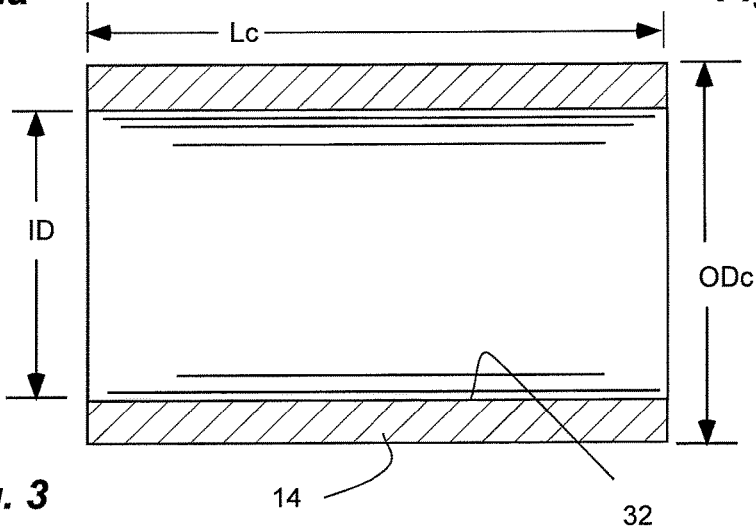
Figure 4:
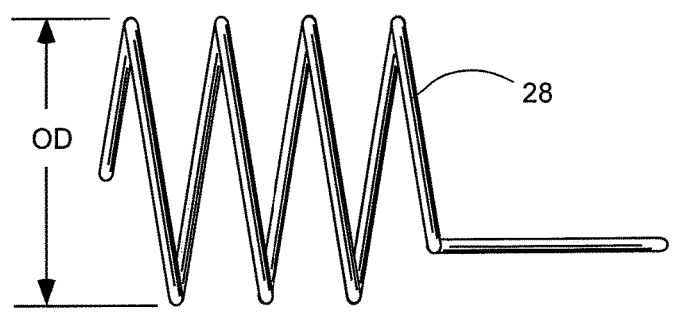
Figure 5:
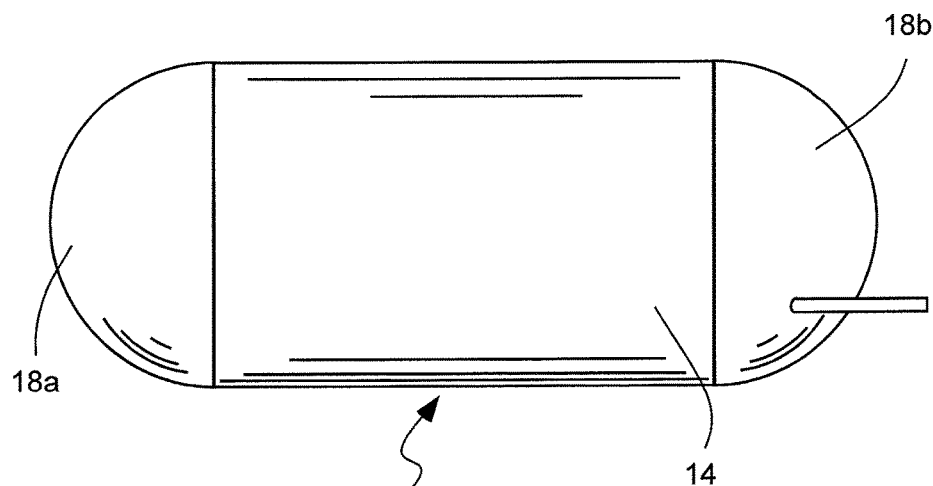
Figure 6:
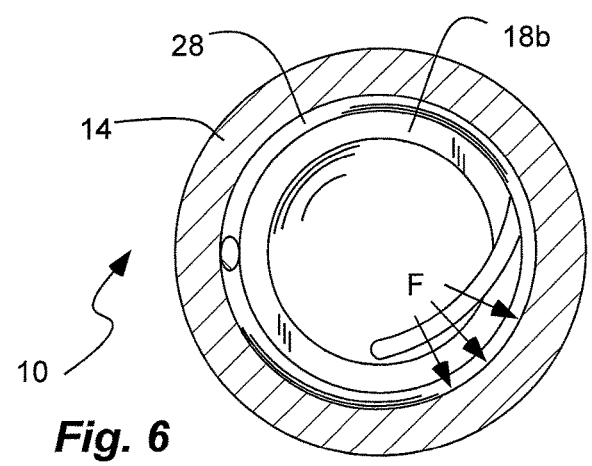

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1a-6, a hydrophone or sensor device, indicated generally at 10, in an example implementation in accordance with the invention is shown. The hydrophone 10 can be an air-backed, end-capped cylinder design that can be grouped together with other hydrophones in frequency specific series/parallel combinations to form useful hydrophone channel assemblies. The hydrophone can include a thin walled, air-backed cylinder of radially polarized, Lead Zirconate Titanate (PZT) piezoelectric ceramic that generates a voltage signal in direct proportion to the magnitude of a pressure wave on the outer diameter of the cylinder. End caps can seal the air-filled cylinder from hydrostatic pressure and shield the inner surface of the cylinder from pressure loading. Positive and negative electrodes can be connected to the inner and outer wall surfaces of the cylinder to transmit low level voltages to signal conditioning, filtering and pre-amplification circuitry. The hydrophone can be used in geophysical marine streamers, towed arrays, disposable towed arrays for UUVs and gliders, commercial fish finders, fish tags, pulmonary sensors, cavitation sensors, acoustic test probes, etc. Geophysical marine streamers can use hydrophone channel assemblies to detect in-water acoustic signals used in oil exploration. Tow platforms can use upwards of 8-10 simultaneous towed line arrays to map large areas of the ocean floor to support oil exploration; and can use thousands of channels of data. Towed arrays can use hydrophone channel assemblies to detect in-water acoustic signals used in target identification.

The hydrophone 10 can comprise an electrode or lead with a shape and a lateral width that extends across an interior of the cylinder, and abuts an inner surface of the cylinder at multiple points. For example the electrode or lead can have a coiled or cork-screw shape defining a spring-loaded configuration abutting to the inner surface of the cylinder in order to eliminate the need for wire solder or curing on the inner surface of the cylinder. In addition, the hydrophone can comprise tapered, self-centering, injection molded end caps to seal the air backed PZT cylinder without the need for alignment fixtures or clean up. Furthermore, The hydrophone can comprise end caps formed of a PolyEtherEtherKetone (PEEK) material with superior acoustic impedance ($Z=\rho c$) matching properties to reduce acoustic scattering within the towed array.

The hydrophone 10 comprises a cylinder 14 with a cylinder wall formed of or comprising a piezoelectric ceramic material, such as radially polarized, Lead Zirconate Titanate (PZT). The hydrophone and/or the cylinder can be small to facilitate the use of a large number of sensors. In addition, the cylinder can have a thin wall. In one aspect, the cylinder can have a length Lc less than 1 inch, less than 0.75 inches in another aspect, and less than or equal to 0.5 inches in another aspect. In one aspect, the cylinder can have an outer diameter ODc less than 0.5 inches, and less than or equal to approximately 0.32 inches in another aspect. In one aspect, the cylinder can have a wall thickness of less than 0.2 inches, less than 0.1 inches in another aspect, and less than or equal to approximately 0.07 inches. In another aspect, the cylinder can have an inner diameter ID of approximately 0.25 inches. The cylinder can have a hollow that can be substantially free of structure (except for an electrode or lead, as described below), and that can contain gas, such as air, defining an air-backed cylinder.

The hydrophone 10 also comprises a pair of end caps 18a and 18b, with each one disposed on a different open end of the cylinder 14. The end caps can have an exterior portion that is exterior of the cylinder, and an interior portion or a tapered, self-centering protrusion 22 that is disposed inside the cylinder. The exterior portion of the end caps can have a convex, semi-spherical shape with a convex, semi-spherical exterior surface forming a dome. The tapered protrusion 22 extends into and mates with the cylinder. The tapered protrusion 22 can have a distal free end with a first outer diameter d1 less than a second outer diameter d2 at a proximal end at the exterior portion. The first outer diameter d1 can be less than the inner diameter ID (i.e. d1<ID) of the cylinder to facilitate insertion of the end cap or protrusion thereof into the cylinder, and can self-align or self-center the end cap with respect to the cylinder. The second outer diameter d2 of the tapered protrusion can be equal to or slightly greater than the inner diameter (i.e. d2≥ID) of the cylinder to form a press-fit or interference-fit and seal with the cylinder. The plastic material of the tapered protrusion can compress to fit in the cylinder. In one aspect, the end caps can remain attached to the cylinder by the press-fit. In another aspect, the end caps can be adhered to the cylinder. In addition, the end caps or exterior portion can have an outer diameter ODec that is the same as the outer diameter of the cylinder (i.e. ODec=ODc). Thus, there is a step or reduced diameter between the outer diameter of the exterior portion of the end cap, and the interior portion or tapered protrusion that abuts to the open end of the cylinder. Furthermore, one of the end caps 18b can have an aperture or hole 24 therethrough (to receive an electrode or lead therethrough, as described below). The end caps and the cylinder can form a hollow that is can be substantially free of structure (except for an electrode or lead, as described below), and that can contain gas, such as air, defining an air-backed cylinder. The tapered, self-centering protrusion 22 seals the cylinder without the need for alignment fixtures or clean up.

In addition, the end caps can comprise a PolyEtherEtherKetone (PEEK) material. The PEEK material and the convex, semispherical exterior surface can reduce acoustic scattering in a towed array. The PEEK material has superior acoustic impedance ($Z=\rho c$) matching properties to reduce scattering in the towed array. The end caps can be formed by injection molding.

The hydrophone 10 also comprises an electrode or lead 28 extending through one of the end caps 18b, or through the aperture 24 thereof, and into the cylinder 14. The aperture can be sized to seal around the electrode or lead, and/or a sealer can be applied. The electrode or lead is electrically coupled to an inner surface 32 of the cylinder. The electrode or lead 28 has a shape and a lateral width that extends across an interior of the cylinder, and abuts an inner surface of the cylinder at multiple points.

The electrode or lead 28 has a coiled shape that defines a spring-loaded configuration and abuts to the inner surface 32 of the cylinder. The shape of the electrode or lead can be a coil, a cork-screw, a helix, a spiral. The coil can have a circular or cylindrical shape with a substantially constant outer diameter, as shown in FIGS. 1a-6. Thus, a majority of a length of the electrode or lead, and the coil, abuts to the inner surface of the cylinder. Thus, the electrode or lead extends across the cylinder, and abuts and contacts the inner surface of the cylinder at multiple points. The coiled shape of the electrode or lead 28 has an outer diameter OD outside of the cylinder 14 that is greater than an inner diameter ID of the cylinder (i.e. OD >ID), so that the electrode or lead applies a spring force F in a radially outward direction to an inner surface 32 of the cylinder. The electrode or lead compresses inside the cylinder and reduces the outer diameter OD of the coil (i.e. OD=ID) in a compressed, inserted configuration. The electrode or lead abutting to the inner surface of the cylinder forms an electrical connection between the electrode or lead and the cylinder, and is electrically conductive. Thus, the electrode or lead 28 abuts to the inner surface 32 of the cylinder and forms an electrical connection without solder or curing, or is solderless. In another aspect, the outer diameter of the coil shape can match the inner diameter of the surface. The electrode or lead 28 can comprise an electrically conductive material or metal, such a beryllium copper (Be—Cu) alloy. The electrode or lead 28 can be formed as a wire, and can have a substantially round cross-sectional shape. In addition, the coiled shape of the electrode or lead can have an open interior space that is free of structure. The coiled shape of the electrode or lead 28 can be a self-supporting shape and capable of maintaining its shape without external support.

Another electrode, or lead, or electrical connection can be electrically connected to the exterior surface of the cylinder.

Figure 7:
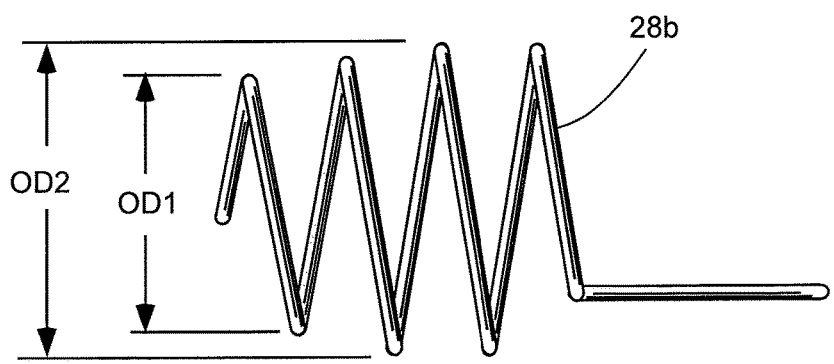
FIG. 7 is a side view of another electrode or lead of a hydrophone in accordance with an embodiment of the present invention.

Referring to FIG. 7, another electrode or lead 28b is shown which is similar in most respect to that described above, and which description is hereby incorporated herein by reference. The electrode or lead 28b has a coil shape, as indicated above, with a tapering or reducing outer diameter. The coil shape of the electrode or lead 28b can have a distal free end with a first outer diameter OD1 that is less than a second outer diameter OD2 of a proximal end of the electrode or lead (i.e. OD1<OD2). In addition, the first outer diameter OD1 of the electrode or lead 28b can be less than the inner diameter ID of the cylinder 14 (i.e. OD1<ID), while the second outer diameter OD2 of the electrode or lead 28b can be greater than the inner diameter ID of the cylinder (i.e. OD2>ID). Thus, the reduced outer diameter OD1 of the distal free end of the electrode or lead 28b can facilitate insertion into the cylinder. The tapering outer diameter of the electrode can be constant or stepped.

Figure 8A:
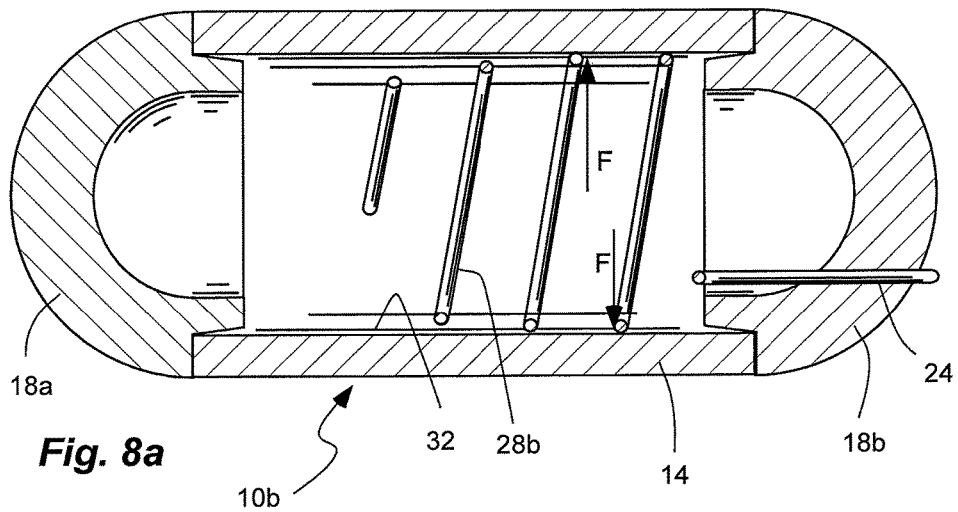
FIG. 8a is a cross-sectional side view of another hydrophone in accordance with an embodiment of the present invention with the electrode or lead of FIG. 7.
Figure 8B:
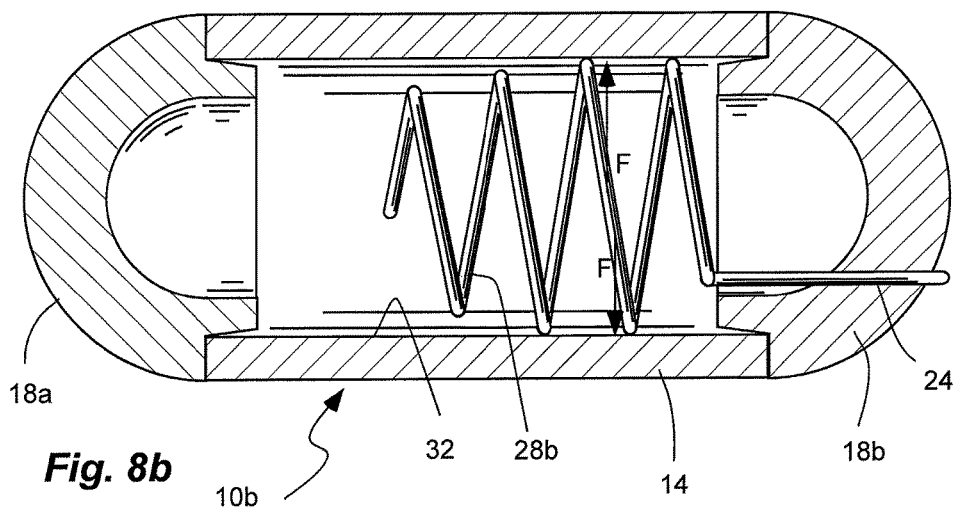
FIG. 8b is a cross-sectional side view of a cylinder and a pair of end caps of the hydrophone of FIG. 8a shown with the electrode or lead without cross-section.

Referring to FIGS. 8a and 8b, another hydrophone 10b is shown which is similar in most respect to that described above, and which description is hereby incorporated herein by reference. The hydrophone 10b has the electrode or lead 28b with the coil shape having a tapering diameter.

Figure 9:
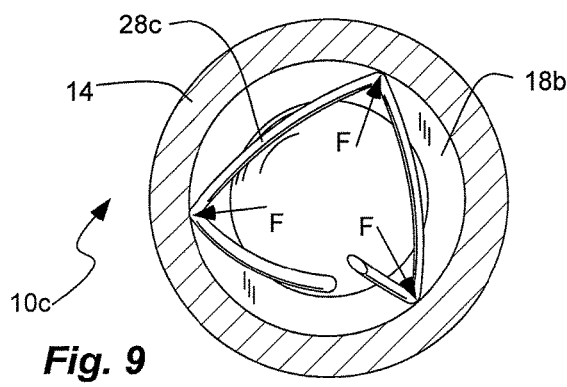
FIG. 9 is a cross-sectional end view of another hydrophone in accordance with an embodiment of the present invention.

Referring to FIG. 9, another hydrophone 10c is shown which is similar in most respect to that described above, and having another electrode or lead 28c which is similar in most respect to that described above, and which descriptions are hereby incorporated herein by reference. The electrode or lead 28c has a coil shape, as indicated above, with an outermost diameter or width that abuts to the inner surface of the cylinder. The coil of the electrode or lead 28c has a non-circular, or non-cylindrical, shape, and can have arcuate or straight segments that form the coil. The segments can form various different shapes of the coil, such as square, triangular (as shown), rectangular, polygonal, etc. The non-circular shape of the coil can form multiple points of contact with the inner surface of the cylinder across the hollow from one another. The segments can form at least a complete revolution, and can have at least three points of contact. The segments can form multiple complete revolutions, for multiple points of contact. For example, as shown in FIG. 9, the electrode or lead 29c can have a coil with a substantially triangular shape, and at least three points of contact.

Figure 10:
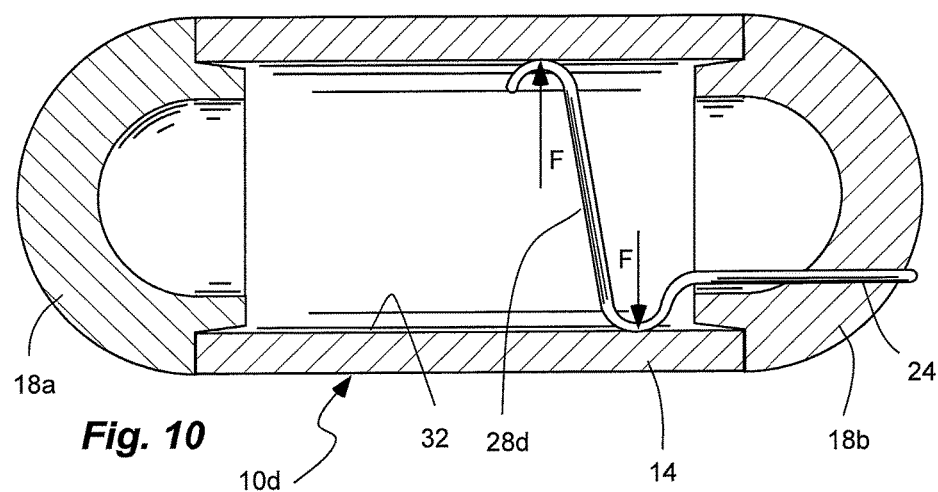
FIG. 10 is a cross-sectional side view of another hydrophone in accordance with an embodiment of the present invention.
Figure 12:
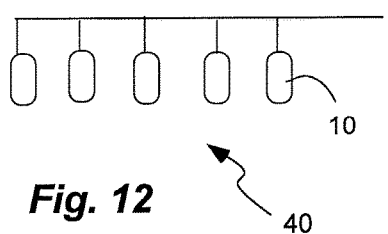
FIG. 12 is a schematic view of a towed array in accordance with an embodiment of the present invention with a plurality of hydrophone devices.
Figure 11:
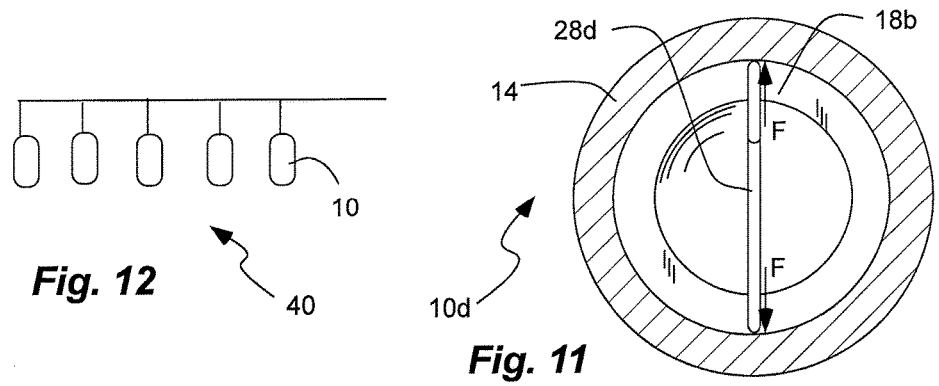
FIG. 11 is a cross-sectional end view of the hydrophone of FIG. 10.

Referring to FIGS. 10 and 11, another hydrophone 10d is shown which is similar in most respect to that described above, and having another electrode or lead 28d which is similar in most respect to that described above, and which descriptions are hereby incorporated herein by reference. The electrode or lead 28d can be bent to extend between opposing sides of the cylinder. In addition, the electrode or lead 28d can be bent to form a bend or shape with a width or diameter greater than the inner diameter of the cylinder, and can define a spring that exerts a force F laterally outwardly against the inner surface of the cylinder to maintain contact between the electrode or lead and the inner surface of the cylinder. The electrode or lead 28d can have at least two points of contact with the inner surface of the cylinder, as shown.

The shape and the lateral width or diameter of the electrode or lead that extends across an interior of the cylinder and abuts an inner surface of the cylinder at multiple points can include the electrode or lead extending around a perimeter of the interior of the cylinder, as shown with a coiled electrode or lead in FIGS. 1a-9, or can include the electrode or lead extending directly across the interior of the cylinder, as shown in FIGS. 10 and 11.

Referring to FIG. 10, a towed array 40 of a plurality of hydrophone devices 10 (or 10b, 10c or 10d) is shown. In one aspect, the hydrophones 10 (or 10b, 10c or 10d) can be connected in parallel, as shown. In another aspect, the hydrophones can be connected in series. Thus, the hydrophone 10 (or 10b) can be one of a plurality of hydrophones in a towed array.

The hydrophone 10 (or 10b, 10c or 10d) as described above can have an outer diameter ODc and/or ODec of 0.32 inches, a length L of 0.8 inches, useful frequency range of 0-12 kHz; resonant frequency greater than 24 kHz; a capacitance (1 kHz) of 5.0 nF (nominal); a dissipation (1 kHz) of less than 0.025; a receiving response (FFVS) of −205 dBV/µPa; an omnidirectional directivity (horizontal); and a weight (in air) of less than 10 grams. In addition, the hydrophone 10 as described above can have a survival pressure of greater than 2,000 psig.

Some aspects of hydrophones are described in U.S. Pat. No. 7,518,952 which is hereby incorporated herein by reference.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A hydrophone device, comprising:
 a) an air-backed cylinder comprising a piezoelectric ceramic material;
 b) a pair of end caps each disposed on a different open end of the cylinder;
 c) an electrode or lead extending through one of the end caps and into the cylinder;
 d) the electrode or lead having a shape and a lateral width that extends across an interior of the cylinder and abuts an inner surface of the cylinder at multiple points; and
 e) the electrode or lead having a spring-loaded configuration applying a spring force in a radially outward direction to the inner surface of the cylinder and forming a solderless electrical connection.

2. The device in accordance with claim 1, wherein the hydrophone device is one of a plurality of hydrophone devices in a towed array.

3. The device in accordance with claim 1, wherein the electrode or lead has a substantially round cross-sectional shape.

4. The device in accordance with claim 1, wherein the electrode or lead has a coiled shape.

5. The device in accordance with claim 4, wherein the coiled shape of the electrode or lead has an outer diameter outside of the cylinder that is greater than an inner diameter of the cylinder.

6. The device in accordance with claim 1, wherein the shape of the electrode or lead is compressed inside the cylinder.

7. The device in accordance with claim 1, further comprising:
 each end cap having a tapered, self-centering protrusion extending into and mating with the cylinder.

8. The device in accordance with claim 1, further comprising:
 each end cap having a convex exterior surface forming a dome.

9. The device in accordance with claim 1, wherein the electrode or lead has a distal free end terminating inside of the cylinder.

10. The device in accordance with claim 1, wherein the electrode or lead has a self-supporting shape capable of maintaining the shape without external support.

11. The device in accordance with claim 1, wherein the electrode or lead forms multiple points of contact with the inner surface of the cylinder and on opposite sides of the cylinder across from one another.

12. The device in accordance with claim 1, wherein the electrode or lead extends around a perimeter of the interior surface of the cylinder for at least a complete revolution.

13. The device in accordance with claim 1, wherein a majority of a length of the electrode or lead abuts to the inner surface of the cylinder.

14. The device in accordance with claim 1, wherein:
 the electrode or lead has a coil shape with a tapering outer diameter, a proximal end and a distal free end;
 an outer diameter of the proximal end of the coil shape is greater than an inner diameter of the cylinder when the electrode or lead is outside of the cylinder, and the electrode or lead is compressed to reduce the outer diameter of the proximal end of the coil shape to equal the inside diameter of the cylinder when the electrode or lead is inserted into the cylinder;
 an outer diameter of the distal free end of the coil is less than the outer diameter of the proximal end of the coil; and
 the outer diameter of the distal free end of the coil is less than an inner diameter of the cylinder to facilitate insertion into the cylinder.

15. The device in accordance with claim 1, wherein the electrode or lead has a coil shape that is non-circular.

16. The device in accordance with claim 1, wherein the electrode or lead forms multiple points of contact with the inner surface of the cylinder and on opposite sides of the cylinder across from one another.

17. A hydrophone device, comprising:
 a) an air-backed cylinder comprising a piezoelectric ceramic material;
 b) a pair of end caps each disposed on a different open end of the cylinder;
 c) an electrode or lead extending into the cylinder and being electrically connected to an inner surface of the cylinder without solder;
 d) the electrode or lead has a coiled shape abutting to the inner surface of the cylinder; and
 e) the electrode or lead having a spring-loaded configuration applying a spring force in a radially outward direction to the inner surface of the cylinder and forming a solderless electrical connection.

18. The device in accordance with claim 17, wherein the coiled shape of the electrode or lead has an outer diameter outside of the cylinder that is greater than an inner diameter of the cylinder.

19. The device in accordance with claim 17, wherein the hydrophone device is one of a plurality of hydrophone devices in a towed array.

20. The device in accordance with claim 17, wherein the coiled shape of the electrode or lead is compressed inside the cylinder.

21. A hydrophone device, comprising:
 a) an air-backed cylinder comprising a piezoelectric ceramic material;
 b) a pair of end caps each disposed on a different open end of the cylinder;
 c) an electrode or lead extending through one of the end caps and into the cylinder and abutting an interior of the cylinder;
 d) the electrode or lead having a coiled shape defining a spring-loaded configuration applying a spring force in a radially outward direction to the interior of the cylinder and forming a solderless electrical connection; and
 e) the coiled shape of the electrode or lead having an outer diameter outside of the cylinder that is greater than an inner diameter of the cylinder so that the electrode or lead applies a spring force in a radially outward direction to an inner surface of the cylinder.

22. The device in accordance with claim 21, wherein the hydrophone device is one of a plurality of hydrophone devices in a towed array.

\* \* \* \* \*